US009268737B2

(12) United States Patent
Hendry

(10) Patent No.: US 9,268,737 B2
(45) Date of Patent: Feb. 23, 2016

(54) MANAGING VIRTUAL COMPUTING SERVICES

(71) Applicant: Morgan Stanley, New York, NY (US)

(72) Inventor: Keith Hendry, Kilmarnock (GB)

(73) Assignee: MORGAN STANLEY, New York, NY (US)

( * ) Notice: Subject to any disclaimer, the term of this patent is extended or adjusted under 35 U.S.C. 154(b) by 280 days.

(21) Appl. No.: 13/795,040

(22) Filed: Mar. 12, 2013

(65) Prior Publication Data

US 2014/0280799 A1   Sep. 18, 2014

(51) Int. Cl.
G06F 15/177 (2006.01)
G06F 9/50 (2006.01)

(52) U.S. Cl.
CPC ............ *G06F 15/177* (2013.01); *G06F 9/5027* (2013.01)

(58) Field of Classification Search
None
See application file for complete search history.

(56) References Cited

U.S. PATENT DOCUMENTS

| 5,893,905 | A * | 4/1999 | Main et al. ................... 705/7.38 |
| 2003/0028640 | A1 * | 2/2003 | Malik ..................... H04L 29/06 709/226 |
| 2003/0061323 | A1 * | 3/2003 | East et al. ..................... 709/223 |
| 2010/0211663 | A1 | 8/2010 | Barboy et al. |
| 2010/0251363 | A1 | 9/2010 | Todorovic |
| 2011/0119478 | A1 * | 5/2011 | Jackson ........................ 713/100 |
| 2011/0153781 | A1 | 6/2011 | Srinivas, et al. |
| 2012/0311116 | A1 * | 12/2012 | Jalan ....................... H04L 67/34 709/222 |
| 2012/0331454 | A1 * | 12/2012 | Cross et al. .................... 717/170 |
| 2013/0007090 | A1 | 1/2013 | Sankararaman |
| 2014/0006534 | A1 * | 1/2014 | Jain et al. ...................... 709/208 |

FOREIGN PATENT DOCUMENTS

WO   WO 2010034608 A1 *   4/2010

OTHER PUBLICATIONS

Wilson, Paul, "Designing a Scalable XenDesktop Farm," Sep. 22, 2010, downloaded from http://www.citrix.com/site/resources/dynamic/additional/ATASeries-Designing-A-Scalable-XenDesktop-Farm-Notes.pdf on Mar. 12, 2013.
"XenDesktop and XenApp Best Practices," Dec. 14, 2012, downloaded from http://support.citrix.com/article/CTX132799 on Mar. 12, 2013.
Spruijt, Rueben, "VDI Smackdown," Mar. 2013, downloaded from http://www.pqr.com/images/stories/Downloads/whitepapers/vdi%20smackdown.pdf on Mar. 12, 2013.

* cited by examiner

*Primary Examiner* — Wing F Chan
*Assistant Examiner* — Padma Mundur
(74) *Attorney, Agent, or Firm* — K&L Gates LLP

(57) ABSTRACT

Computer-implemented systems and methods for managing virtual computing services. A service interface may receive from an administrative user an instruction indicating a configuration change for a first virtual computing service. A plurality of agents comprises a leader agent and at least one other agent. The leader agent may assign to the at least one other agent a plurality of jobs for implementing the configuration change. The at least one other agent may execute at least one of the plurality of jobs, where executing the at least one of the plurality of jobs comprises modifying a configuration of a virtual desktop site associated with the first virtual computing service.

20 Claims, 7 Drawing Sheets

MANAGING VIRTUAL COMPUTING SERVICES

BACKGROUND

Many enterprises utilize virtual computing services to manage the computing needs of their employees and other users. Virtual computing services allow enterprises to provide desktop functionality to users without the need to install all necessary software, such as operating systems, etc., on the local user devices. Typically, all or part of the software necessary to implement a virtual computing service (e.g., a virtual desktop, virtual application, or group of virtual applications) is hosted at a central processing location. Users utilize local machines to access a virtual computing service hosted by the central server.

Virtual computing services are often implemented using one or more virtual desktop sites or farms at the central processing location. Each virtual desktop site hosts one or more virtual computing services that are provided to local user devices. Virtual computing services can be deployed in different forms. In some implementations, the virtual desktop site hosts all of the functionality of a virtual desktop. The user, through the local machine, is provided with an operating system and applications executed remotely at the virtual desktop site. Some users may be provided with user-specific virtual desktops, with the central processing location maintaining user profile information and implementing local storage. In some implementations, the virtual desktop site streams a virtual desktop to a local user device such that some software components of the virtual desktop are executed at the local user device. Also, in some implementations, virtual desktop technology is utilized to provide users with applications that are executed at the central processing location, but accessed via the local user devices.

Virtual computing services provide advantages to users and to enterprise information technology (IT) groups. Users can have access to a common desktop and/or application regardless of the location or capabilities of the local user device that they utilize. IT groups benefit by having all virtually provided desktops and/or apps hosted at the central processing location. This simplifies software maintenance as updates and/or patches can be applied to the various virtual desktop sites and need not be separately pushed or otherwise installed to each local user device. Security is similarly simplified. The process of updating the central processing location, including the virtual desktop sites, however, creates additional complications.

FIGURES

Various embodiments of the present invention are described here by way of example in conjunction with the following figures, wherein.

DESCRIPTION

Figure 1:
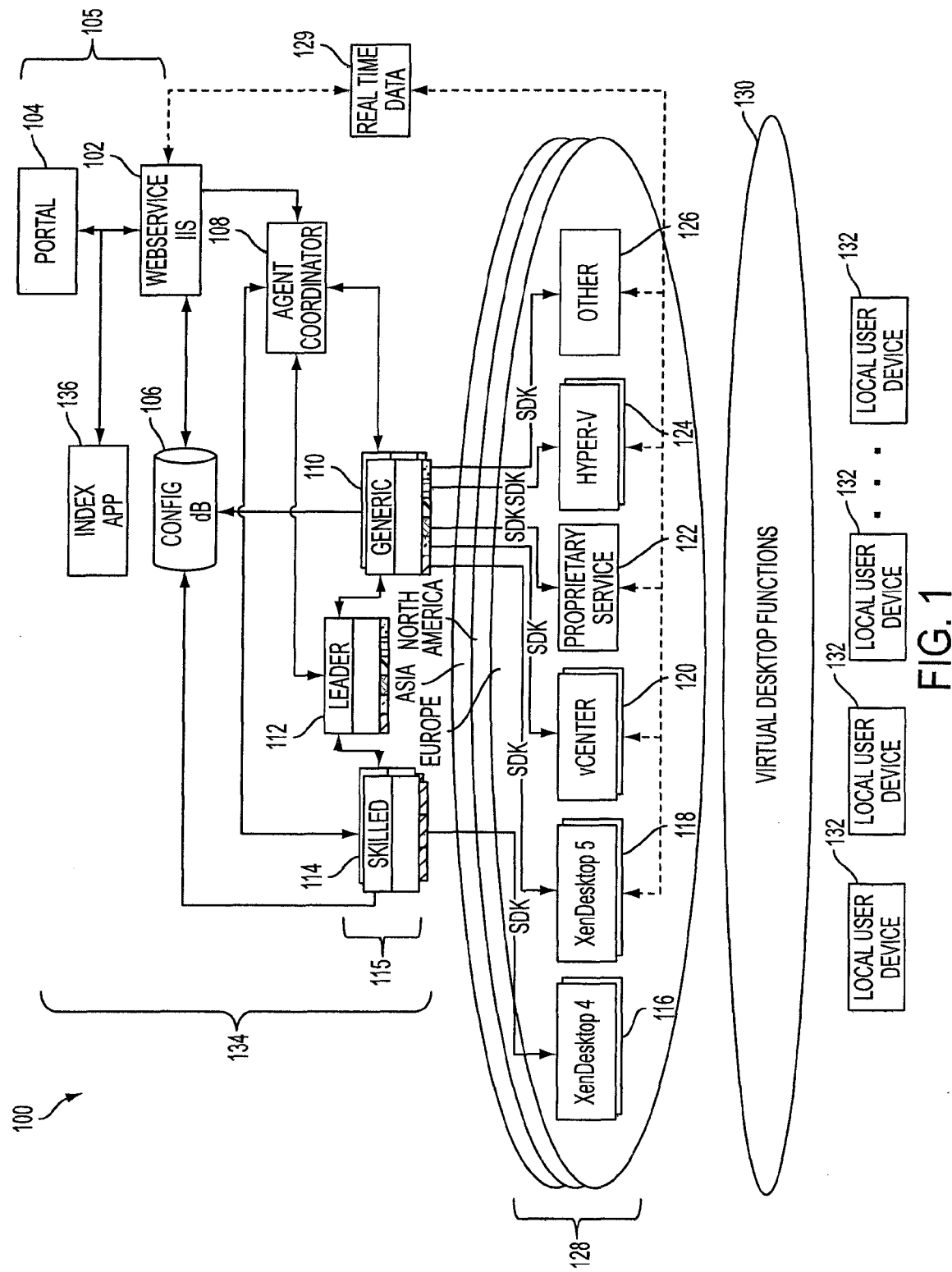
FIG. 1 is a block diagram showing one embodiment of an environment for implementing the systems and methods for managing virtual computing services.

Various embodiments are directed to systems and methods for managing virtual computing services. As used herein, the term virtual computing service refers to various types of computing services provided to local user devices and managed by central processing locations. For example, virtual computing services include the provision of complete virtual desktops facilitated by the central processing location (e.g., by an associated virtual desktop site). A complete virtual desktop may comprise desktop functionality such as an operating system, at least one application, storage, etc. In various embodiments, virtual desktop sites may facilitate virtual desktops by hosting virtual desktops, streaming the virtual desktops to local user devices and/or managing virtual desktops stored and executed at local user devices. Virtual computing services also comprise virtual applications that are hosted, streamed and/or managed by a virtual desktop site. For example, virtual applications may be provided to physical (e.g., non-virtual) desktops according to various different methods.

In some embodiments, a central processing location executes a service interface for receiving configuration changes from administrative users (e.g., users associated with the information technology (IT) function of an enterprise). The received configuration changes may apply to a single virtual service and/or a group of virtual computing services. The central processing location may execute a plurality of agents for implementing a requested configuration change. The agents may be executed by various servers or other computer hardware at the central processing location. In some embodiments, some or all of the agents are executed by virtual desktop sites that also host virtual computing services.

Changing the configuration of a virtual computing service (or hosting virtual desktop site) may comprise changing an association between one or more virtual computing service and one or more end users. Different virtual computing services may be associated with or assigned to end users in different ways. Some virtual computing services may be uniquely assigned to a single end user. The single end user may be authorized to access the virtual computing service to the exclusion of other end users. The single end user may be assigned to the virtual computing service manually or upon the first access to the virtual computing service. Some virtual computing services may be assigned to (and accessible by) a group of end users. For example, a virtual desktop site may host a pool of virtual computing services that are assigned on a first come, first served basis to end users belonging to a defined group. Changes to the configuration of a virtual application may be similarly implemented.

The plurality of agents may execute various jobs for implementing configuration changes received from administrative users. A leader agent, selected from among the plurality of agents, may assign the various jobs to particular agents. In some embodiments, the leader agent also facilitates updates to the configuration of the agents. Agents that are not leader agents may be classified as skilled agents or as non-skilled agents. Non-skilled or generic agents may be capable of performing general processing jobs. Skilled agents may comprise functionality that allows the skilled agents to perform particular jobs. Skilled agents may be distinguished from non-skilled agents, for example, based on inherent functionality and/or access to resources. For example, some skilled agents comprise functionality that other agents lack such as, for example, functionality for accessing an application program interface (API) of a particular type of virtual desktop site. Also, some skilled agents are distinguished on the basis of the resources to which the agent has access. For example, a skilled agent may be hosted by the same hardware that hosts a particular virtual desktop site (e.g., a CITRIX XENDESKTOP 4 farm). Such an agent may have the capability to modify the configuration of the relevant virtual desktop site, including virtual computing services stored thereon. The leader agent may assign skilled agents with jobs corresponding to their skill, sometimes to the exclusion of other jobs.

In various embodiments, a plurality of jobs may be grouped into an execution group. An execution group may comprise a name, a distributed queue of jobs, and an exclusive state. The exclusive state describes a position in the distributed queue. For example, from the exclusive state and the distributed queue, it may be possible to derive a job from the queue that are executed, are being executed, and/or have yet to be executed. In various embodiments, the execution group may be executed according to a sequence defined, at least in part, by the distributed queue. For example, the leader agent and/or a separate agent coordinator, may implement a locking system. Before executing a job from the distributed queue, an agent may request a lock associated with the job. If the lock is available, the agent may execute the job. If the lock is not available, the agent may not execute the job (and may attempt to execute the next job in the queue). The lock for any given job may be unavailable, for example, if the job is already being executed by another agent and/or if one or more predicate jobs are not yet completed. Predicate jobs may be jobs that must be completed prior to execution of the job. In some embodiments, execution groups are executed in a manner dependent on the geographic location of the associated virtual desktop site or sites. For example, the agents selected to execute an execution group may be agents implemented logically and/or geographically near the virtual desktop site or sites.

The service interface may provide administrative users with synchronous and asynchronous methods for implementing configuration changes. According to a synchronous method, the administrative user may request that a configuration change be implemented directly by the service interface. According to an asynchronous method, the service interface may derive one or more jobs for implementing the configuration changes, expressed as a distributed queue indicating the order in which the jobs are to be executed. The service interface may further map the distributed queue to particular agents. The distributed queue and mapping may collectively represent an execution group. The execution group is pushed directly to the leader agent or an agent coordinator for execution by the agents. The leader agent or agent coordinator maps the jobs from the distributed queue to other agents for execution. According to a second example asynchronous method, the central processing location may comprise a configuration database that stores configuration data for various virtual desktop sites. The interface, e.g., upon the request of an administrative user, stores a configuration change to the configuration database. The leader agent may cause one or more other agents to periodically implement a synch job. When executing the synch job, the one or more other agents may compare the current configurations of the various virtual desktop sites to the configurations stored at the configuration database. If a difference is found, the difference, as indicated at the configuration database, may be pushed to the appropriate virtual desktop site or sites. In some embodiments, detected differences are saved to the configuration database (e.g., as a difference table). When a detected difference appears in the difference table, it may be pushed to the appropriate virtual computing service. In this way, a detected difference must be present for at least two cycles of the synch job to be pushed to the virtual computing service (e.g., a first cycle that pushes the detected difference to the detected difference to the difference table and a second cycle that finds the detected difference in the difference table and pushes it to the virtual computing service).

FIG. 1 is a block diagram showing one embodiment of an environment 100 for implementing the systems and methods for managing virtual computing services. The various components of the environment 100 are software modules that may be executed on any suitable type of hardware. Examples of hardware and hardware systems for executing the environment 100 are provided herein at FIG. 7. The environment 100 comprises various virtual desktop sites 128. The virtual desktop sites 128 provide various virtual computing services to one or more local user devices 132. For example, the virtual desktop sites 128 may be in communication with the one or more local user devices 132 via a local and/or wide area network including wired and/or wireless connections. The local user devices 132 may include any suitable type of computer device capable of receiving virtual computing services. For example, local user devices 132 may include desktop computers, laptop computers, tablet computers, smart phones, etc. Local user devices 132 may, but need not, have processing capacity sufficient to execution virtual desktops and/or applications locally.

The virtual desktop sites 128 may comprise any suitable type of virtual desktop site. For example, the virtual desktop sites 128 may comprise one or more XENDESKTOP 4 farms 116 available from CITRIX SYSTEMS, INC., one or more XENDESKTOP 5 sites 118, also available from CITRIX SYSTEMS, INC., one or more VCENTER sites 120 available from VMWARE, INC., one or more proprietary virtual desktop service sites 122, one or more HYPER-V sites 124 available from MICROSOFT, INC., and one or more other sites 126 for providing various other virtual computing service functionality 130. The various virtual desktop sites 128 may provide different kinds of virtual computing services 130. For example, some sites 128 host virtual computing services that are executed exclusively at the respective site 128 and provided to the local user devices 132. Also, various sites 128 provide virtual computing services that are streamed to user devices 132 such that processing to implement the virtual computing service is partially or completely performed at the local user device 132. Some sites 128 are configured to provide virtual computing services in the form of local virtual machines that are stored and run locally on a local user device 132. The site 128 may act as a hypervisor that synchronizes the locally stored virtual computing service with a master image on the site. Additionally, some sites 128 may provide virtual application services that include one or more individual applications instead of all desktop components. Such virtual applications may be hosted at the respective site 128, streamed from the site 128 to the local user device 132 and/or hosted locally and managed by hypervisor functionality executed at the site 128.

The various sites 132 may be managed by a management system 134. The management system 134 comprises various agents 115, an agent coordinator 108, a configuration database 106 and a service interface 105, and an optional index application 136. The agents 115 may execute various jobs, as described below, for managing the virtual desktop sites 128. Agents may comprise skilled agents 114, generic or non-skilled agents 110 and a leader agent 112. A leader agent 112 may be elected, for example, upon agent start up, as described below. The leader agent 112 may perform various management tasks including, for example, assigning jobs to the various other agents 115 and managing configurations of the other agents 115. Skilled agents 114, by virtue of their coded capabilities and/or capabilities of the hardware executing the skilled agents 114, may be capable of performing specialized jobs. For example, agents 114 executed at an XENDESKTOP 4 site 116 may have skills for configuring the site 116. Non-skilled or generic agents 110 may be configured to perform general jobs, for example, under the direction of the leader agent 112. Although three agents 110, 112, 114 are shown, it will be appreciated that any suitable number of agents, and any suitable number of agents of each respective type, may be used. The agent coordinator 108 may provide functionality, described herein, for managing the operations of the various agents 115. One example product that may implement the agent coordinator is the ZOOKEEPER software package available from the APACHE SOFTWARE FOUNDATION.

The configuration database 106 may store configuration data describing configurations of various components of the management system 134. For example, the configuration database 106 may store configuration data describing the configurations of the various virtual desktop sites 128 including, for example, configurations of various remote virtual computing services (e.g., desktops and/or applications) hosted or otherwise facilitated by the sites 128. In some embodiments, the configuration database 106 may also store data describing the configurations of various other components of the management system 134, including the configurations of various agents 115. The service interface 105 may comprise a portal 104 and (optionally) a web service 102. Together, the portal 104 and the web service 102 implement the service interface 105 that may allow administrative users to request configuration changes in virtual desktop sites 128, as described herein. Also, in some embodiments, the service interface 105 may comprise functionality for transforming a requested configuration change or change into a set of jobs to be executed on the various virtual desktop sites 128 (e.g., executed by the various agents 115). The index application 136 may be programmed to record and index instructions received from administrative users through the service interface 105.

Figure 2:
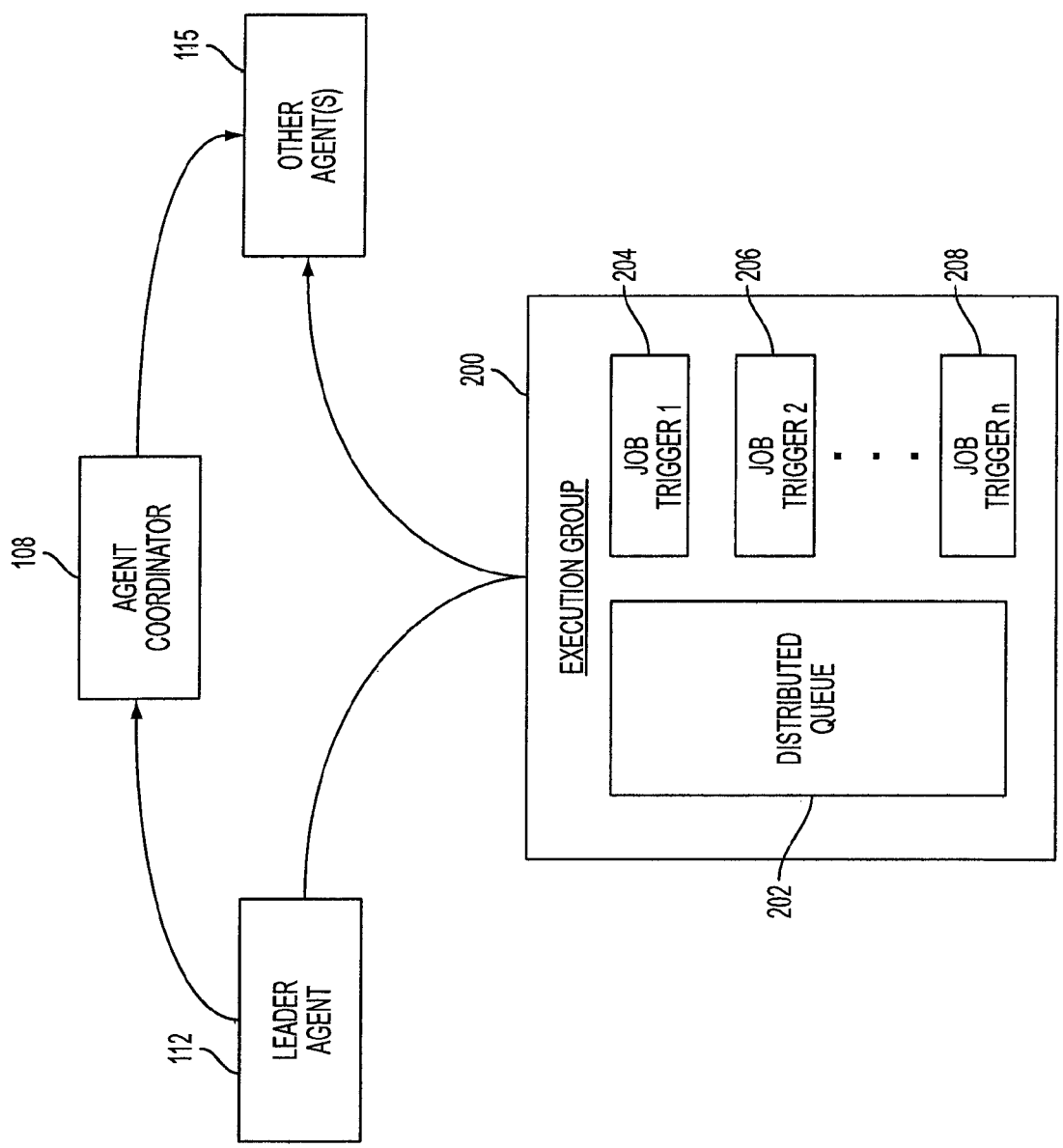
FIG. 2 is a block diagram showing one embodiment of a configuration for implementing an execution group.

FIG. 2 is a block diagram showing one embodiment of a configuration for implementing an example execution group 200. Execution groups, such as the group 200, may be utilized by the management system 134 to implement configuration changes to the various virtual desktop sites 128. For example, execution groups may be groupings of jobs to be executed by the management system 134 (e.g., agents 115 thereof) to update or modify a configuration of a virtual desktop site 128. Each execution group 200 may comprise a distributed queue 202 of jobs and may comprise a plurality of job triggers 204, 206, 208 for implementing the jobs in the queue 202. An execution group 200 may be described by a name and an exclusive state. The exclusive state describes a position of the execution group on the distributed queue. In conjunction with the distributed queue, the exclusive state may indicate jobs from the queue that have been executed, are being executed and/or have yet to be executed. For example, the exclusive state may be indicated by a pointer directed to a position in the distributed queue. In some embodiments, an execution group 200 may also be described by a distribution factor. The distribution factor may indicate a distribution of the jobs from the queue 202 across all agents 110, 114. For example, the distribution factor may indicate a percentage of mapped agents to which the jobs in the queue will be distributed. In some embodiments, execution groups may comprise jobs that are exclusively for execution by skilled agents or exclusively for execution by un-skilled agents.

To maintain the exclusive state of an execution group 200, it is desirable for the management system 134 to execute the jobs indicated by the distributed queue 202 in order (e.g., a job order) and one at a time. The leader agent 112 may assign jobs from the distributed queue 202 to various other agents 115. For example, the leader agent 112 may distribute the various job triggers 204, 206, 208 to the other agents 115. Each job trigger 204, 206, 208 may comprise data describing the associated job. For example, the job triggers 204, 206, 208 may indicate details of the associated job; a chronological table indicating an order and/or periodic nature of the job; a priority of the job; monitoring details for the job; and (optionally) an alternate action to be taken if the scheduled time for executing the job has passed. In some embodiments, the job triggers 204, 206, 208 are generated by the agent coordinator 108 and/or the leader agent 112. The leader and/or agent coordinator 108 may implement a management mechanism for ensuring that the other agents 115 execute the jobs in the queue 202 in order so as to maintain the exclusive state of the execution group 200. For example, the various job triggers 204, 206, 208 may indicate an execution time or schedule indicating to each of the other agents 115 when the agents are to execute their assigned jobs. Also, in some embodiments, the leader agent 112 and/or the agent coordinator 108 may implement a lock system. For example, an agent 115 may be assigned a job along with an indication of a lock that must be obtained before executing the job. When the agent 115 is to perform a job, it first requests the associated lock from the agent coordinator 108 and/or the leader agent 112. The agent coordinator 108 and/or leader agent 112 may provide the lock only if all of the predicate jobs have been completed. Upon receiving the lock, the agent 115 may perform the job. Upon performance of the job, the agent 115 may return the lock to the agent coordinator 108 or other central processing location. This may indicate that the lock for the next job in the queue 202 may be provided when requested by an agent 115.

Figure 3:
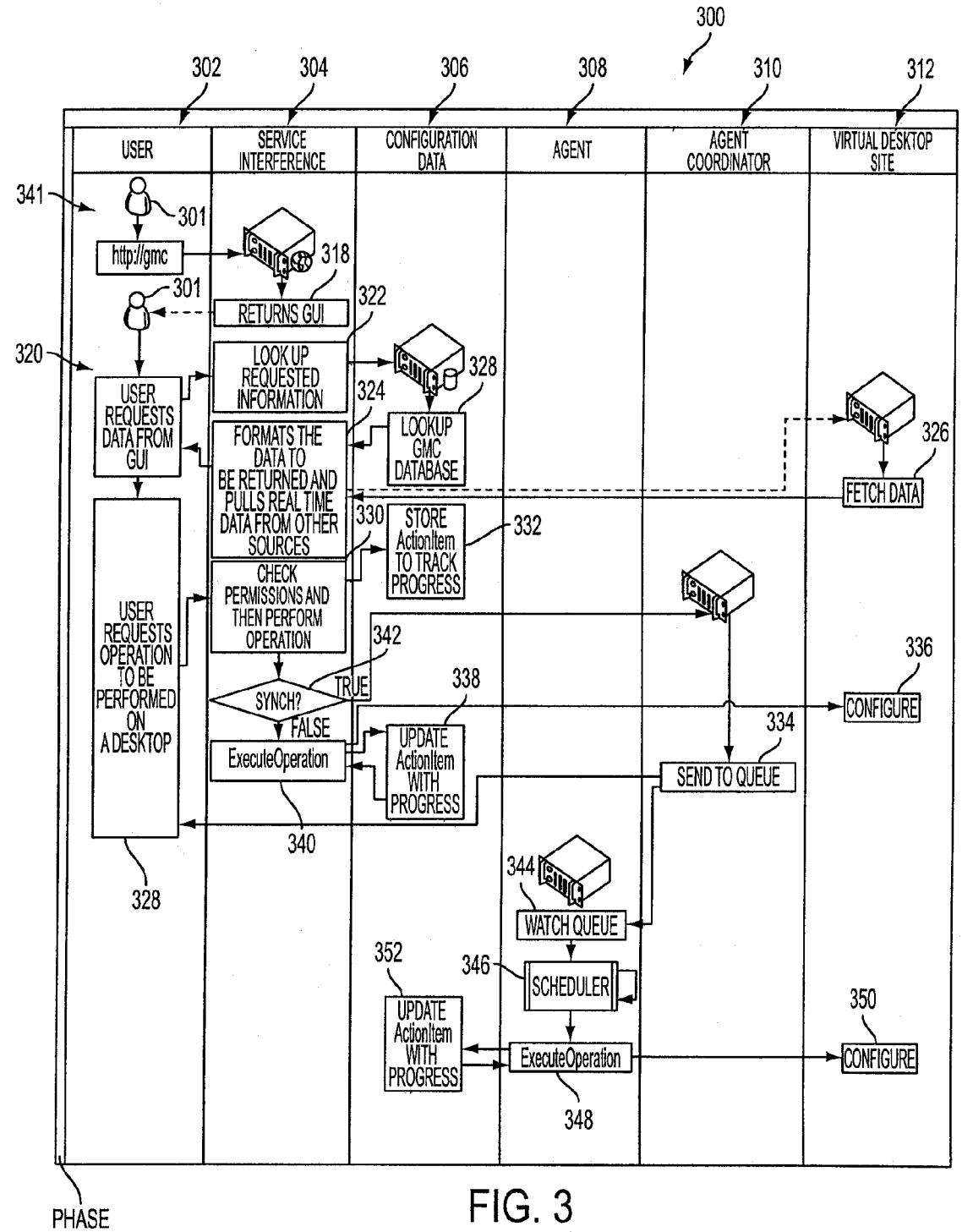
FIG. 3 is a flow chat showing one embodiment of a process flow that may be implemented by the management system to manage the configuration of one or more virtual desktop sites.

FIG. 3 is a flowchart showing one embodiment of a process flow 300 that may be implemented by the management system 134 to manage the configuration of one or more virtual desktop sites 128. The process flow 300 is shown in conjunction with columns 302, 304, 306, 308, 310, 312 indicating actions performed by different components of the management system 134. For example, column 302 indicates actions performed by an administrative user 301. Column 304 indicates actions performed by the service interface 105. Column 306 indicates actions performed by the configuration database 106. Column 308 indicates actions performed by an agent or agents 115. Column 310 indicates actions performed by the agent coordinator 310. Column 312 indicates actions performed by a virtual desktop site 128. It will be appreciated that the process flow 300 illustrates just one example distribution of actions among the administration user 301 and the various components of the system 134. Other distributions may be used instead.

At 314, the administrative user 301 may access the service interface 105. The service interface 105 (e.g., web service 102) may, at 318, provide a user interface to the administrative user 301 (e.g., via the portal 104). Through the interface, the administrative user 301 may request data describing the configuration of at least one virtual desktop site 128. The requested information, for example, may pertain to a configuration of the site 128 and/or the configuration of one or more virtual computing services hosted and/or managed by the site 128. At 322, the service interface 105 may look up the requested information. For example, a version of the requested configuration may be retrieved from the configuration database 106 at 328. Also, a version of the requested configuration may be retrieved from the relevant virtual desktop site 128 at 326. (The transfer described at 326 is an example of real time data 129 provided to the service interface 105 and shown in FIG. 1). At 324, the service interface 105 may format the data returned from the configuration database 106 and the site 128 and provide it to the administrative user 301 (e.g., via the interface).

At 328, the administrative user 301 may request that a change in the configuration of the virtual desktop site 128 or sites. For example, the administrative user 301 may request that a change be made to one or more virtual computing services hosted and/or administered by the site 128 or sites. Various types of changes may be supported. For example, the administrative user 301 may assign or de-assign a end user to a virtual computing service, add or remove a end user to or from a group of end users authorized to access a virtual computing service (e.g., virtual desktop or virtual application), add or remove a virtual desktop site 128 to the scope of the management system 134, add or remove a folder of virtual computing services to or from a virtual desktop site 128, add or remove a group of virtual computing services from a virtual desktop site 128, change a name of a virtual computing services, change a maintenance mode of a virtual computing services, and/or change whether a virtual computing service is configured to be a part of a group of virtual computing services. It will be appreciated that any of these operations may be executed for a single user, virtual computing service, virtual application, virtual desktop site 128, group, etc., or over multiple examples of one or more of each.

At 330, the service interface 105 may determine whether the administrative user 301 has permission to perform the requested configuration change and initiate performance of the operation. At 332, the configuration database 106 may store an action item to track progress of the configuration change. At 342, the service interface 105 may determine whether the configuration change is to be implemented in a synchronous or asynchronous manner. In some embodiments, this is indicated by the administrative user 301. If the configuration change is to be made in a synchronous manner, the service interface 105 may execute the configuration change at 340, for example, by writing the configuration change directly to the affected virtual desktop site 128 or sites at 336. Upon completion of the configuration change, the configuration database 106 may update the action item set at 332 so that the database 106 reflects the newly made configuration change.

Referring back to 342, if the configuration change is to be implemented in an asynchronous manner, the agent coordinator 108 may receive an indication of the configuration change and send it to a queue for the various agents 115 at 334. In some embodiments, the service interface 105 may deconstruct the requested configuration change into one or more jobs to be executed by agents 115 to bring about the change. Also, in some embodiments, this operation may be performed by the agent coordinator 108 or other central processing location. At 344 an agent 115 may watch the queue. A scheduler of the agent 115 may schedule execution of a job for implementing the configuration change at 346. At 348, the agent 115 may execute the job to bring about the configuration change, causing the configuration change at 350. At 352, the configuration database may update the action item set at 332 to indicate the new configuration of the virtual desktop site 128. In some embodiments, the configuration change may require more than one job. For example, the configuration change may be expressed as all or part of an execution group, such as the group 200 described herein. In this case, the actions 344, 346, 348, 350, 352 may be performed multiple times by the same agent 115 or different agents 115 to bring about the requested configuration change.

The process flow 300 illustrated synchronous and asynchronous modes of implementing configuration changes. It will be appreciated that the administrative user may select a synchronous or asynchronous mode based on the type and number of configuration changes to be made. For example, a change to a single virtual computing service or to virtual computing services hosted and/or administered by a single virtual desktop site 128 may be made synchronously. Changes to multiple virtual computing services across multiple virtual desktop sites may be performed asynchronously.

Figure 4:
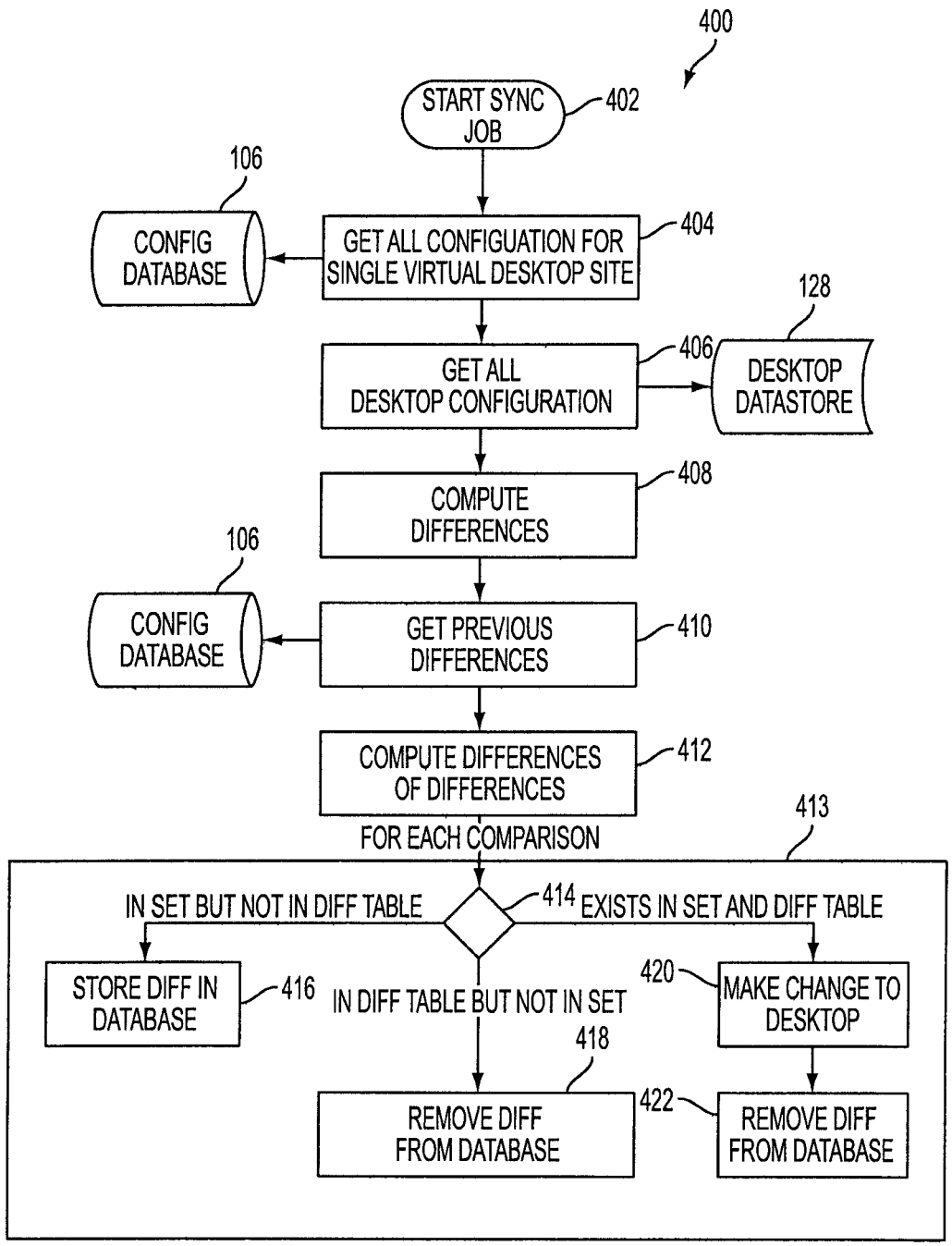
FIG. 4 is a flow chart showing one embodiment of a process flow that may be implement by the management system to execute a synch job.

In addition to the synchronous and asynchronous modes described in the process flow 300, the management system 134 may also implement a second asynchronous mode utilizing the configuration database 106. For example, the administrative user (through the service interface 105) may make a change to the configuration for a virtual desktop site 128 stored at the configuration database 106. This may occur in lieu of actually making the configuration change at the site 128. The agents 115 may be configured to implement a periodic synch job that propagates changes from the configuration database 106 to the associated virtual desktop site 128. FIG. 4 is a flow chart showing one embodiment of a process flow 400 for implementing such a synch job. The synch job may begin at 402. The synch job may be executed by an agent 115. For example, the leader agent 112 may assign the synch job to another agent 115 (e.g., a generic agent 110) to be executed periodically (e.g., every day, every eight hours, every week, etc.). Also, in some embodiments, execution of the synch job may be handled by multiple agents 115.

The agent 115 may start execution of the synch job at 402. At 404, the agent 115 may retrieve configurations for all of the virtual desktop sites 128 from the configuration database 106. In some embodiments, where multiple agents 115 execute the synch job, each agent 115 may be responsible for a portion of the set of all virtual desktop sites 128. At 406, the agent 115 may receive configurations for all of the virtual desktop sites 128 (or all sites under the responsibility of the agent 115) from the sites 128 themselves. At 408, the agent 115 may compute differences, if any, between the configurations received from the configuration database 106 and the configurations received from the sites themselves. In some embodiments, the agent 115 may also retrieve a set of previous differences. Previous differences may be stored at the configuration database 106, for example, as a difference table. The previous differences may reflect differences between the database 106 and the respective sites 128 generated during a previous iteration of the synch job. At 412, the agent 115 may compute a difference of differences. The difference of difference may reflect configuration differences that are also part of the previous differences (e.g., were detected during a previous instance of the synch job) and/or configuration differences that are new since the last execution of the synch job.

In some embodiments, the actions illustrated in box 413 may be performed by the agent 115 for each comparison between a site configuration as stored at the configuration database 106 and the corresponding site configuration stored at the site 128 itself. For example, at 414, the agent 115 may determine whether a particular configuration difference was noted in the previous differences received from the configuration database 106 at 410. The presence of a configuration difference at the database 106 may indicate that the difference was also present at the last execution of the synch job. If the difference is evident from the comparison at 408, but is not stored as part of the previous differences at the database 106, the agent 115 may updated the previous differences at the database 106 at 416. If the difference is reflected in the database 106, but is not reflected in the comparison at 408, then the agent 115 may remove the difference from the database 106. If the difference is reflected by the comparison at 408 and in the difference data received from the database 106, then the agent 115 may implement the configuration change to the appropriate virtual desktop site 128 at 420 and remove the difference from the database 106, at 422.

In this way, any configuration changes entered into the configuration database 106 are propagated to the virtual desktop sites 128 upon the second execution of the synch job. It will be appreciated that the number of synch job iterations necessary before a configuration change added to the database 106 is propagated to the sites 128 may be modified and set to any suitable value. For example, the synch job may be configured to write implement every configuration difference as a configuration change to an appropriate virtual desktop site 128 for every iteration of the synch job for which the configuration difference exists.

Figure 5:
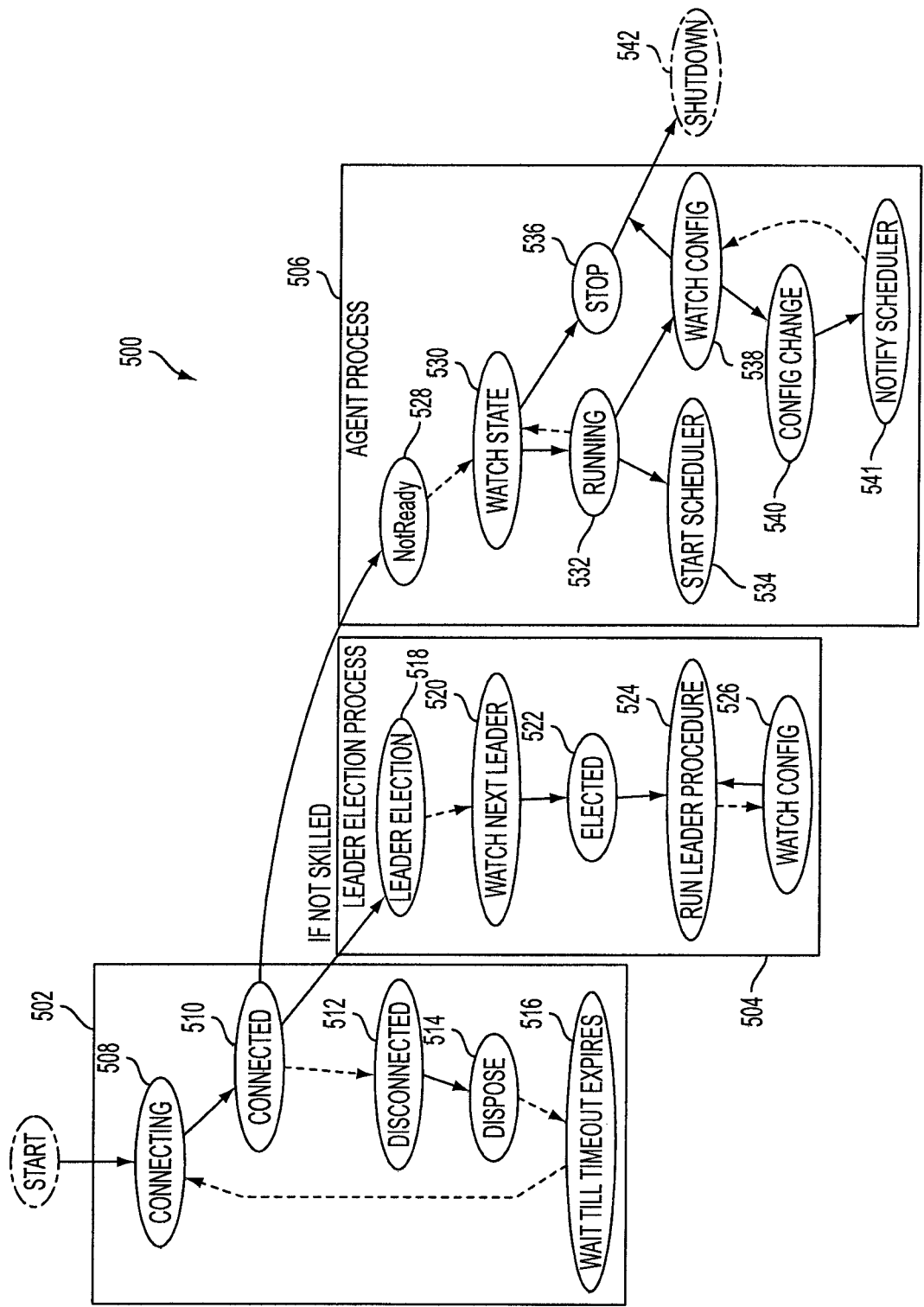
FIG. 5 is a flow chart showing one embodiment of a process flow that may be executed by an agent over its lifecycle.

FIG. 5 is a flow chart showing one embodiment of a process flow 500 that may be executed by an agent 115 over its lifecycle. Boxes 502, 504, and 504 include actions that may be performed by the agent 115 at different states of its lifecycle. For example, box 502 shows actions executed by an agent 115 in an initial state. Box 504 shows actions that may be executed by the agent 115 as part of the leader election process state. Box 506 shows actions that may be executed by the agent 115 during an agent process state. The process 500 may start at 502 when the agent 115 is activated. At 508, the agent 115 may connect to the appropriate agent coordinator 108. In some implementations of the management system 134, there may be multiple instances of the agent coordinator 108. The agent 115 may connect to the coordinator 108 that is in its geographic area and/or a coordinator 108 having load capacity to take on the agent 115. At 510, the agent 115 may be connected to the agent coordinator 108. If the agent 115 is disconnected from the coordinator 108, at 512, it may dispose of its configuration at 514, wait until a time-out expires at 516 and the return to the connecting action at 508.

After connection at 510, the agent 115 may transition either to the agent process state 506 and/or the leader election process state 504. If the agent 115 is a skilled agent 114, it may transition directly to the agent process state 506. For example, a skilled agent 114 may not be considered for selection as the leader agent 112. For agents 115 that transition to the leader election process state 504, a leader election may take place at 518. The leader election may select an agent 115 to be the leader agent 112 for further processing. The leader agent 112 may be selected in any suitable manner. In some embodiments, leader selection procedure may be handled by the ZOOKEEPER software package available from the APACHE SOFTWARE FOUNDATION. At 520, the agents 115 may watch for the next leader, which may be elected at 522. If an agent 115 is not elected leader, it may transition to the agent process state 506. If an agent 115 is elected leader then it may alternately run the leader procedure job at 524 (See FIG. 6) and watch the configuration state of the other agents at 526.

An agent 115 (e.g., 114, 110) may initially enter the agent process state 506 in a not ready state 528. The agent 115 may subsequently transition to a watch state 530. At the watch state 530, the agent 115 may monitor a job queue implemented, for example, by the agent coordinator 108 and/or the leader agent 112. Skilled agents 114, in the watch state, may report their skill capability to the leader agent 112. The leader agent 112 may, in return, assign to the skilled agent 114 jobs (e.g., job triggers) that require or benefit from the skilled agent's skill capability. The job queue may be, for example, a distributed queue 202 of an execution group 200. The agent 115 may receive a stop instruction (e.g., from the leader agent 112 and/or the agent coordinator 108). Upon receipt of a stop instruction, the agent 115 may transition to a stop state 536 and subsequently to a shutdown state 542. Alternatively, from the watch state 530, the agent 115 may be assigned a job. For example, a job trigger may appear on a queue at the agent coordinator 108 associated with the agent 115. The agent 115 may enter a running state 532 upon assignment of a job. From the running state 532, the agent 115 may start an agent scheduler at 534. The scheduler may organize and schedule jobs to be performed by the agent 115. Also, from the running state 532, the agent 115 may transition to a watch configuration state 538, where the agent 115 may monitor the leader agent 112 for an indication of a change to the agent's configuration. If a configuration change is requested by the leader agent 112, the agent 115 may enter a configuration change state 540 where the requested change is implemented. Additional details of agent configuration changes are provided below with respect to FIG. 6. If the agent 115 does make a configuration change, it may notify the scheduler at 541. For example, the configuration change may affect the types of jobs that the agent 115 is capable of doing.

Figure 6:
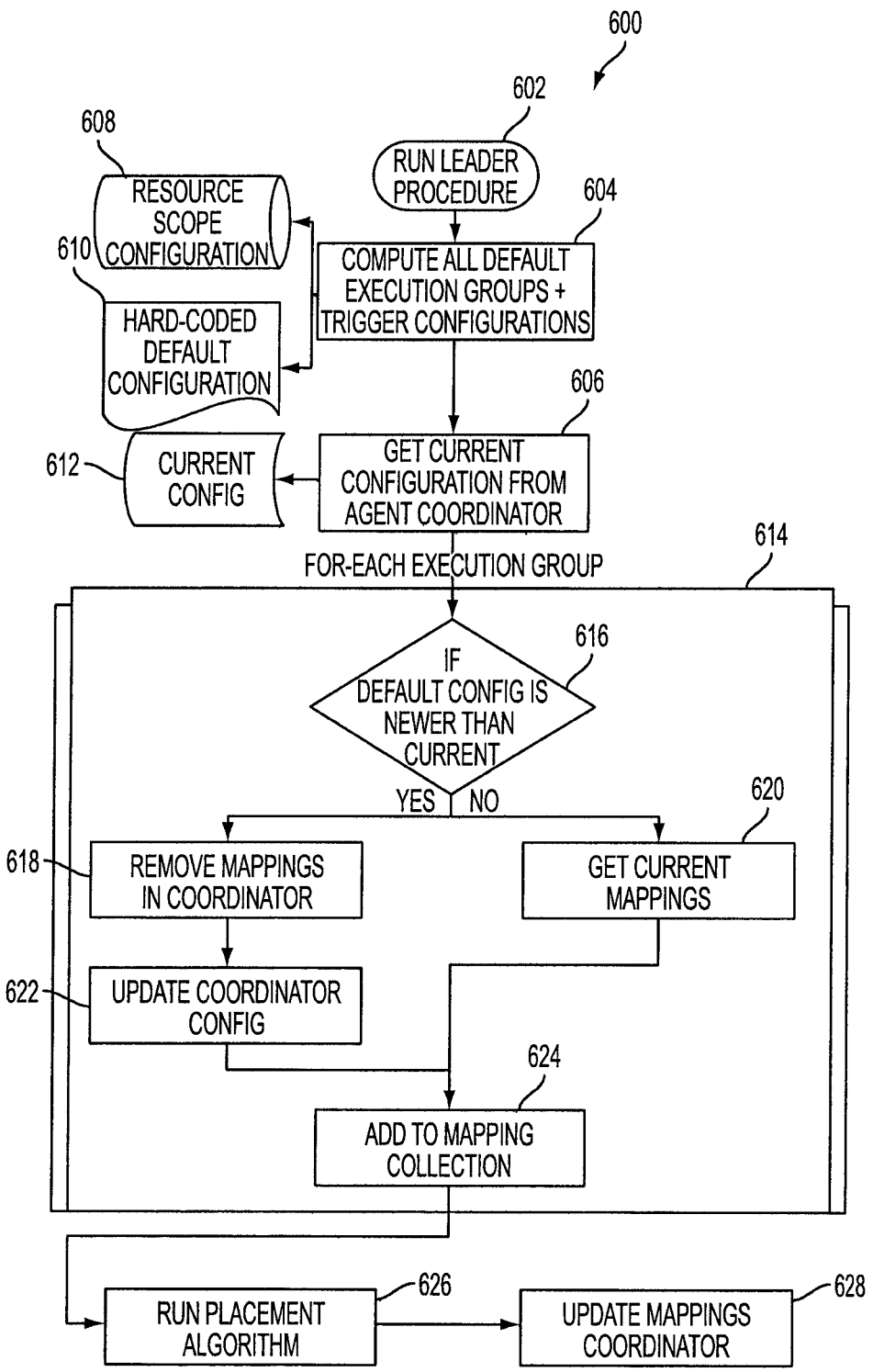
FIG. 6 is a flow chart showing one embodiment of a process flow for executing the leader procedure or job referenced in the process flow of FIG. 5.

FIG. 6 is a flow chart showing one embodiment of a process flow 600 for executing the leader procedure or job referenced at 524 of the process flow 500. For example, the process flow 600 may be executed by the leader agent 112. The leader procedure may begin at 602. At 604, the leader agent 112 may compute default execution groups and trigger configurations. For example, referring to FIG. 2, the leader agent 112 may generate the execution group 200 including the configuration of the triggers 204, 206, 208. In computing the default execution groups and trigger configurations, the leader agent 112 may refer to a resource scope configuration 608 a hard-coded default configuration 610. The configurations 608, 610 may describe actual and potential configurations of various agents 115. Example configurations include skilled and generic or non-skilled. The resource scope configuration 608 may be stored at the configuration database 106 and may indicate a planned configuration of each agent 115 current executing. The hard-coded default configuration 610 may indicate the configuration that an agent 115 is hard coded to implement and may be accessible to the leader agent 112 by directly querying the respective agent 115 and/or by examining source code for the agent 115 (e.g., stored at the configuration database 106).

At 606, the leader agent 112 may obtain a current configuration for each agent 115. The current configuration 612 may be obtained, for example, from the agent coordinator 108. In various embodiments, the default configuration 610 and the current configuration 612 may each be associated with a signature. This may allow the leader agent 112 to determine whether a configuration is out of date by comparing the signatures of the configurations 610, 612. Box 614 represents actions that may be performed for each execution group. For example, each execution group may be associated with one or more agents 115 for executing the jobs at the distributed queue of the execution group. At 616, the leader agent 112 may determine if the default configuration 610 is newer than the current configuration 612. If not, then the leader agent 112 may, at 620, obtain current mappings between the agent 115 and its configuration (e.g., from the agent coordinator 108). These mappings may be added to a mapping collection at 624. If the default configuration 610 is newer than the current configuration, then the leader agent 112 may remove mappings at the agent coordinator 108 between the agent 115 and the current configuration 612 and update the mappings at 622 to reflect the default configuration as the new configuration. The updated mappings may be added to the mapping collection at 624. A placement algorithm may be run at 626 to push configuration changes to specific agents (e.g., agents at states 538 and 540 from above). Mappings at the coordinator 108 may be updated to reflect any agent configuration changes at 628.

Figure 7:
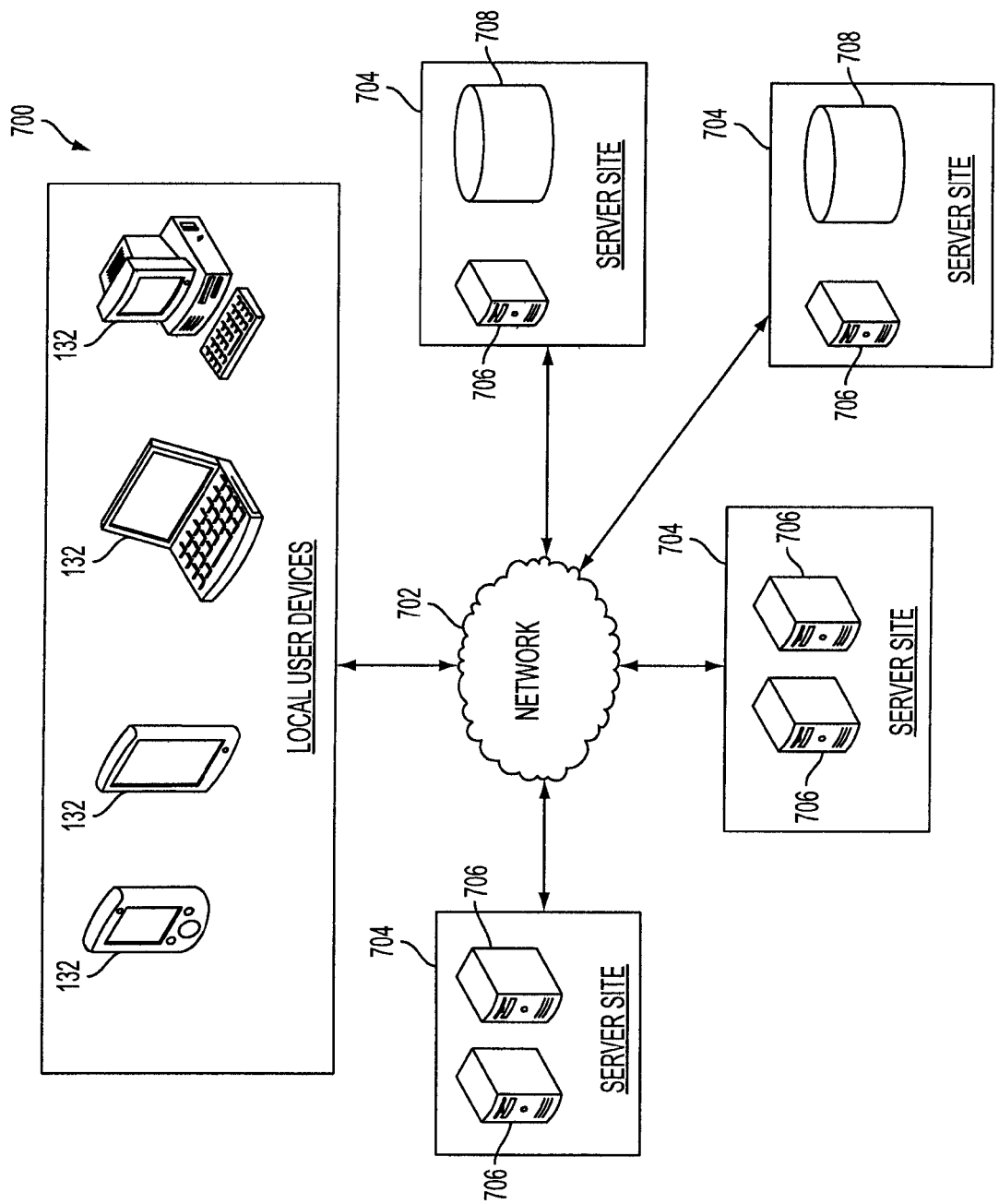
FIG. 7 is block diagram illustrated one embodiment of a hardware environment for implementing the various systems and methods described herein.

FIG. 7 is block diagram illustrated one embodiment of a hardware environment 700 for implementing the various methods and systems described herein. The hardware environment 700 comprises a plurality of server sites 704. Each server site 704 may comprise one or more servers 706. Some server sites 704, in addition to or instead of a server 706, may comprise one or more databases 708. The various server sites 704 may execute different components of the environment 100 described above. For example, the configuration database 106 may be implemented by one or more of the databases 708. In various embodiments, some of the server sites 704 may implement virtual desktop sites 128. Various server sites 704 may implement agents 115, the agent coordinator 108, the service interface 105, the index application 136, etc. In some embodiments, a server site 704 executing a virtual desktop site 128 may additionally execute one or more agents 115, as described herein. The various server sites 704 may be in communication with each other and with local user devices 132 via a network 702. The network 702 may be wired, wireless and/or mixed. The network 702 may utilize various local area networks (LAN) and/or wide area networks (WAN) such as the Internet. Collectively, the various server sites 704 may implement the central processing location. The various server sites 704 may be positioned at a single geographic location and/or may be distributed across multiple geographic locations.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, methods or processing structures described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused descriptions would not facilitate a better understanding of the present invention, and therefore, a more detailed description of such elements is not provided herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques, such as Platform as a Service (PaaS) may be employed in connection with various embodiments of the invention. For example, one or more of the virtual desktop sites 128 may be implemented according to an SaaS or PaaS model.

Moreover, the processes associated with the present embodiments may be executed by programmable equipment, such as computers. Software or other sets of instructions that may be employed to cause programmable equipment to execute the processes. The processes may be stored in any storage device, such as, for example, a computer system (non-volatile) memory, an optical disk, magnetic tape, or magnetic disk. Storage devices may be local or remote relative to the hardware executing the processes (e.g., remote storage, cloud-based or distributed storage, etc.). Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer device," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. Various systems described herein may be implemented utilizing computers including, for example the Health Tracking System 102, and the various other systems 106, 108, 110, 112, 114, 116, 118.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers or computer systems described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability. In some embodiments a server farm and/or PaaS may be implemented in a manner that is transparent to the party implementing the system (the implementing party). For example, a PaaS system may be implemented by a service provider, such as WINDOWS AZURE, GOOGLE cloud platform, etc. The service provider may manage physical servers and other computer equipment. The implementing party may not manage or even be aware of the physical nature of the computers or storage devices that are used. Instead, the PaaS system may be presented to the implementing party as logical units of computing power and storage leased from the service provider.

Various embodiments of the systems and methods described herein may employ one or more electronic computer networks to promote communication among different components, transfer data, or to share resources and information. For example, the various systems 102, 106, 108, 110, 112, 114, 116, 118 may be in communication via one or more electronic computer networks. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

We claim:

1. A computer-implemented system for managing virtual computing services, the system comprising at least one processor and operatively associated memory, wherein the at least one processor is programmed to execute:
 a service interface to receive from an administrative user an instruction indicating a configuration change for a first virtual computing service; and
 a plurality of agents:
  wherein a leader agent selected from the plurality of agents is to assign to at least one other agent selected from the plurality of agents a plurality of jobs for implementing the configuration change, wherein the assigning comprises:
   determining that a first job selected from the plurality of jobs that is associated with a first skill capability;
   receiving from a second agent selected from the plurality of agents an indication that the second agent has the first skill capability, wherein the first skill capability comprises at least one capability selected from the group consisting of: an application program interface for accessing a virtual desktop of a first type, or access to at least one resource that is not accessible to agents not having the first skill capability; and
   assigning the first job to the second agent, wherein the second agent is to execute the first job, and wherein executing the first job comprises modifying a configuration of a virtual desktop site associated with the first virtual computing service.

2. The system of claim 1, wherein the service interface is also to push the plurality of jobs to a queue associated with the at least one other agent.

3. The system of claim 1, wherein the service interface is also to push the configuration change to an entry at a configuration database corresponding to the first virtual computing service.

4. The system of claim 3, wherein the leader agent is configured to assign a synch job for execution to a third agent selected from the plurality of agents, wherein executing the synch job comprises:
 receiving from the configuration database an indication of a database configuration for a virtual desktop site that hosts the first virtual computing service;
 receiving from the virtual desktop site an indication of an actual configuration of the virtual desktop site; and
 comparing the database configuration and the actual configuration to derive a configuration difference set indicating at least one difference between the database configuration and the actual configuration.

5. The system of claim 4, wherein executing the synch job further comprises:
 writing the configuration difference set to the configuration database;
 comparing the configuration difference set to a prior configuration difference set written to the configuration database by a previously executed instance of the synch job; and
 identifying at least one configuration difference common to the configuration difference set and the prior configuration difference set, wherein the plurality of jobs comprises at least one job for applying, to the virtual desktop site, the at least one configuration difference common to the configuration difference set and the prior configuration difference set.

6. The system of claim 4, wherein the plurality of jobs comprises at least one job for applying the configuration difference set to the virtual desktop site.

7. The system of claim 1, wherein the plurality of agents are configured to select the leader agent from the plurality of agents.

8. The system of claim 1, wherein the second agent is also to receive, from the leader agent, at least one job trigger for at least a second job associated with the skill capability.

9. The system of claim 1, wherein the plurality of jobs are indicated to be executed according to a job order, wherein the at least one processor is further programmed to execute an agent coordinator, and wherein the agent coordinator is configured to implement a lock system to ensure that the plurality of jobs are executed according to the job order.

10. The system of claim 1, wherein assigning the plurality of jobs for implementing the configuration change to the at least one other agent selected from the plurality of agents comprises pushing a plurality of job triggers to a queue associated with the at least one other agent, wherein each of the plurality of job triggers indicates:
 a description of a corresponding job selected from the plurality of jobs;
 a chronological table indicating an order in which the plurality of jobs is to be executed;
 an action to be taken if a scheduled time for executing the corresponding job is missed; and
 a priority of the corresponding job.

11. The system of claim 1, wherein the service interface is also to receive from the administrative user a second instruction indicating a second configuration change for a second virtual computing service, and implement the second configuration change by modifying a configuration of a virtual desktop site associated with the second virtual computing service.

12. A computer-implemented method for managing virtual computing services, the method comprising:
 executing, by a computer system, a service interface to receive from an administrative user an instruction indicating a configuration change for a first virtual computing service, wherein the computer system comprises at least one processor and operatively associated memory; and
 executing a plurality of agents:
  wherein a leader agent selected from the plurality of agents is to assign to at least one other agent selected from the plurality of agents a plurality of jobs for implementing the configuration change, wherein the assigning comprises:
   determining that a first job selected from the plurality of jobs that is associated with a first skill capability;
   receiving from a second agent selected from the plurality of agents an indication that the second agent has the first skill capability, wherein the first skill capability comprises at least one capability selected from the group consisting of: an application program interface for accessing a virtual desktop of a first type, or access to at least one resource that is not accessible to agents not having the skill capability; and
   assigning the first job to the second agent, wherein the second agent is to execute the first job, and wherein executing the first job comprises modifying a configuration of a virtual desktop site associated with the first virtual computing service.

13. The method of claim 12, wherein the service interface is also to push the plurality of jobs to a queue associated with the at least one other agent.

14. The method of claim 12, wherein the service interface is also to push the configuration change to an entry at a configuration database corresponding to the first virtual computing service.

15. The method of claim 14, wherein the leader agent is configured to assign a synch job for execution to a third agent selected from the plurality of agents, wherein executing the synch job comprises:
   receiving from the configuration database an indication of a database configuration for a virtual desktop site that hosts the first virtual computing service;
   receiving from the virtual desktop site an indication of an actual configuration of the virtual desktop site; and
   comparing the database configuration and the actual configuration to derive a configuration difference set indicating at least one difference between the database configuration and the actual configuration.

16. The method of claim 15, wherein executing the synch job further comprises:
   writing the configuration difference set to the configuration database;
   comparing the configuration difference set to a prior configuration difference set written to the configuration database by a previously executed instance of the synch job; and
   identifying at least one configuration difference common to the configuration difference set and the prior configuration difference set, wherein the plurality of jobs comprises at least one job for applying, to the virtual desktop site, the at least one configuration difference common to the configuration difference set and the prior configuration difference set.

17. The method of claim 15, wherein the plurality of jobs comprises at least one job for applying the configuration difference set to the virtual desktop site.

18. The method of claim 12, wherein the plurality of agents are configured to select the leader agent from the plurality of agents.

19. The method of claim 12, wherein the second agent is also to receive, from the leader agent, at least one job trigger for at least a second job associated with the skill capability.

20. The method of claim 12, wherein assigning the plurality of jobs for implementing the configuration change to the at least one other agent selected from the plurality of agents comprises pushing a plurality of job triggers to a queue associated with the at least one other agent, wherein each of the plurality of job triggers indicates:
   a description of a corresponding job selected from the plurality of jobs;
   a chronological table indicating an order in which the plurality of jobs is to be executed;
   an action to be taken if a scheduled time for executing the corresponding job is missed; and
   a priority of the corresponding job.

* * * * *